United States Patent
Curtis (10) Patent No.: US 7,650,419 B2
(45) Date of Patent: *Jan. 19, 2010

(54) MULTI-MEDIA REMOTE DATA ACCESS TERMINALS AND SYSTEM

(75) Inventor: Allen J. Curtis, Simi Valley, CA (US)

(73) Assignee: AXXS Technologies Corporation, Pasadena, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 11/225,836

(22) Filed: Sep. 12, 2005

(65) Prior Publication Data

US 2006/0036753 A1 Feb. 16, 2006

Related U.S. Application Data

(63) Continuation of application No. 09/154,940, filed on Sep. 17, 1998, now Pat. No. 6,944,667.

(51) Int. Cl.
*G06F 15/16* (2006.01)
*G06F 7/04* (2006.01)

(52) U.S. Cl. .......................... 709/229; 726/2

(58) Field of Classification Search .................. 709/227, 709/229, 200, 203, 225; 726/3

See application file for complete search history.

(56) References Cited

U.S. PATENT DOCUMENTS

| 4,897,868 A | 1/1990 | Engelke et al. |
| 4,960,338 A | 10/1990 | Sheldon |
| 5,119,319 A | 6/1992 | Tanenbaum |
| 5,504,675 A | 4/1996 | Cragun et al. |
| 5,590,197 A | 12/1996 | Chen et al. |
| 5,590,199 A | 12/1996 | Krajewski et al. |
| 5,602,905 A | 2/1997 | Mettke |
| 5,604,803 A | 2/1997 | Aziz |
| 5,613,001 A | 3/1997 | Bakhoum |
| 5,771,354 A | 6/1998 | Crawford |
| 5,903,633 A | 5/1999 | Lorsch |
| 5,953,504 A * | 9/1999 | Sokal et al. .................. 709/227 |

* cited by examiner

*Primary Examiner*—Paul H Kang
(74) *Attorney, Agent, or Firm*—William W. Haefliger

(57) ABSTRACT

In a public internet access terminal, the combination comprising an access station, and computer apparatus at the station and including a user keyboard and data display means, and a user credit card reader at the station, and the computer apparatus including circuit means operatively connected to the card reader to be responsive to reading of user credit card data to enable user access to the internet via the computer apparatus at the access station.

1 Claim, 9 Drawing Sheets

MULTI-MEDIA REMOTE DATA ACCESS TERMINALS AND SYSTEM

This application is a continuation of parent application Ser. No. 09/154,940, filed Sep. 17, 1998 now U.S. Pat. No. 6,944,667.

BACKGROUND OF THE INVENTION

This invention relates generally to facilitation of communication via the internet, and from various or selected publically accessible points; more particularly it concerns an improved public internet access terminal.

There exists need for travelers or other persons to gain ready access to the internet, for enhanced communication purposes.

SUMMARY OF THE INVENTION

It is a major object of the invention to provide apparatus meeting the above need, and in such way that ready payment for use of such a service is provided, as well as facilitation of the user's desired terminal configuration at various public terminals used.

Basically the improved terminal comprises:

a) an access station, and b) computer apparatus at the station and including a user keyboard and data display means, c) a user credit card reader at the station, and said computer apparatus including circuit means operatively connected to the card reader to be responsive to reading of user credit card data to enable user access to the internet via said computer apparatus at the access station.

As will appear, the access station may be a public access station having an associated kiosk carrying said computer apparatus, and card reader.

Another object is to provide a terminal kiosk that includes a housing in which said computer apparatus is stored, said data display means also carried by the kiosk housing. The housing may have a display opening, and said data display means includes a display screen viewable at said opening. Further, the kiosk may include support means carried by the housing to be movable relative to the housing, for carrying said computer means from the housing interior to the housing exterior, for access. Also the housing may include an openable door blocking such movement of the support means from the housing interior to the housing exterior, and locking means to lock the door in closed position.

A further object includes provision of circuit means that is responsive to reading of a credit card to i) determine if that card identifies a current account customer user, whereby if "yes", the user is instructed via the display means to enter his password via the keyboard to enable subsequent performance of user requested operations associated with use of the internet, ii) and if "no", the user is instructed via the display means to confirm via the keyboard that a new account is to be established, and to enter new account information via the keyboard for storage by server means, and the user is then enabled to perform user requested operations, via the keyboard, and associated with the internet.

Yet another object includes provision for automatic use billing to the user, at accessed terminals. Multiple terminals may be provided, with circuitry operating whereby a user keyboard selected display configuration at one terminal is duplicated at another terminal in response to user commands to the keyboard at said other terminal, via signal transmission on the internet.

These and other objects and advantages of the invention, as well as the details of an illustrative embodiment, will be more fully understood from the following specification and drawings, in which:

DETAILED DESCRIPTION

Figure 1:
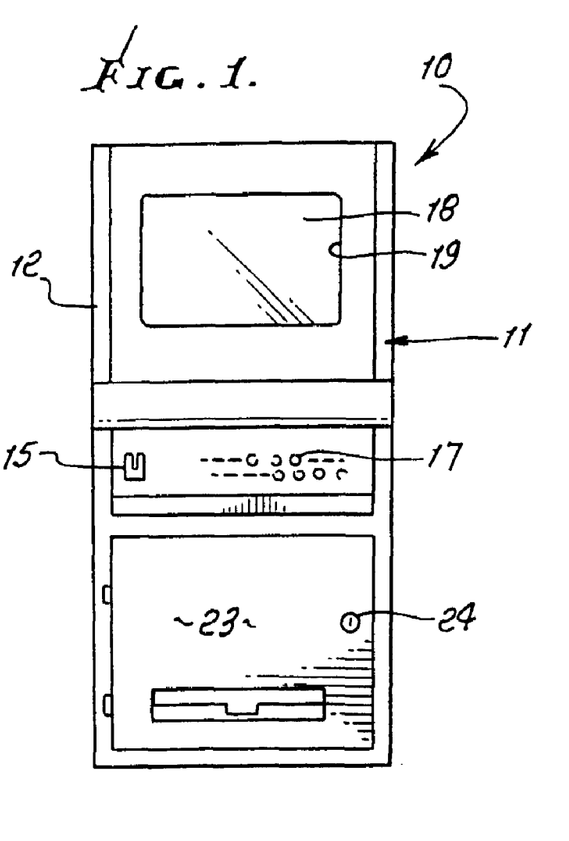
FIG. 1 is a front elevation view of a kiosk.
Figure 2:
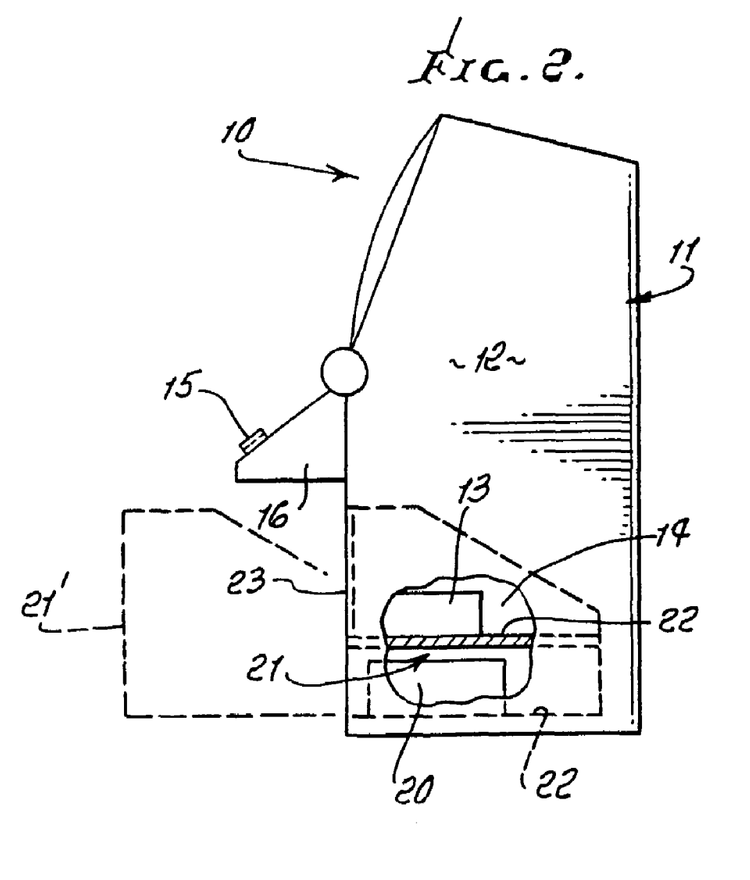
FIG. 2 is a side elevation view of the FIG. 1 kiosk.
Figure 3:
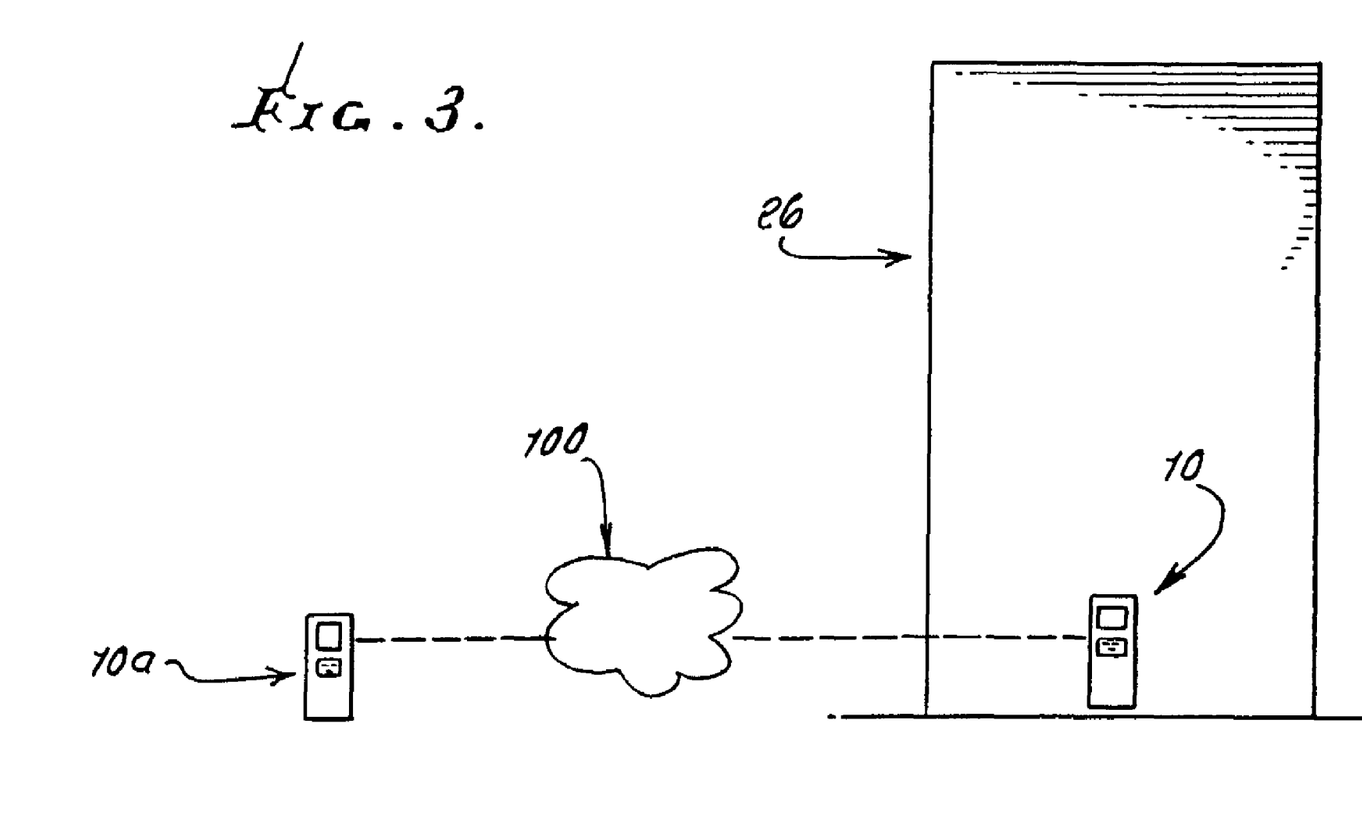
FIG. 3 is a view showing multiple stations incorporating kiosks, and interconnected via the internet.

Referring first to FIGS. 1-3, a public access terminal 10 may include an access station having a kiosk 11. The latter includes an upright housing 12 for carrying computer apparatus shown at 13 with the housing interior 14. The kiosk also carries a credit card reader 15 on a shelf 16 that also carries a user keyboard indicated at 17, and connected with 13. Reader 15 is conventional, and may magnetically read user data stored in the magnetic strip on a card, as the card is passed endwise in the reader. A display, such as a CRT (or other type) screen 18 is viewable at front opening 19 defined by the kiosk. The computer apparatus 13, as well as a printer 20, may be received on support means 21 including shelves 22 which is movably supported to be pulled forwardly to position 21' seen in FIG. 2, for access to the computer or printer. A housing door 23 normally blocks such forward movement of the support means, and may be locked at 24 in closed position. Upon unlocking, the door may be opened to allow forward movement as referred to.

FIG. 3 shows a public access terminal 10, as in a public building 26, for example a hotel, and to which guests may have access. Another remote terminal is shown at 10c, the two terminals connected via the internet designated at 100.

Figure 4A:
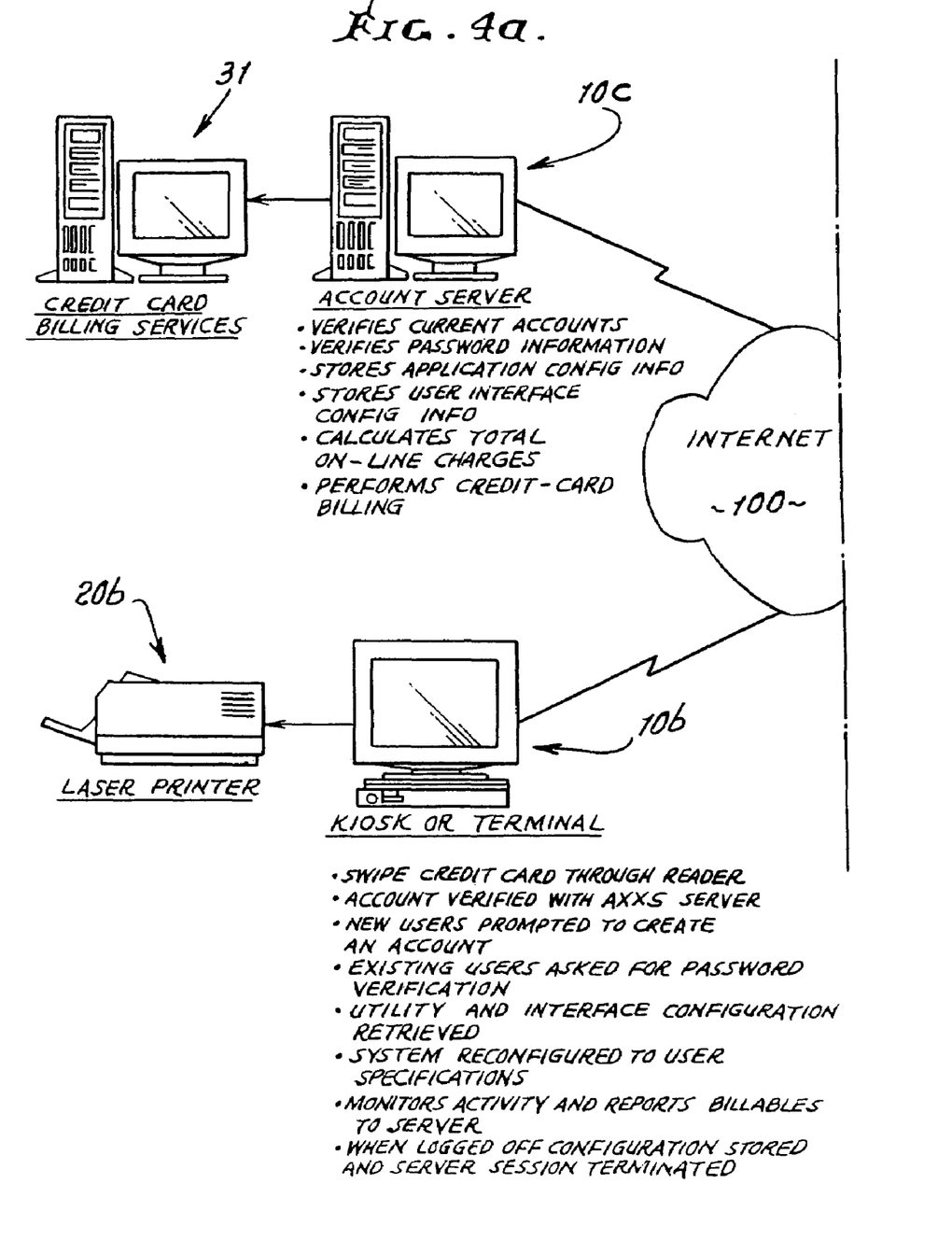
FIG. 4 is a system diagram showing multiple internet connected terminals and their functions.
Figure 4B:
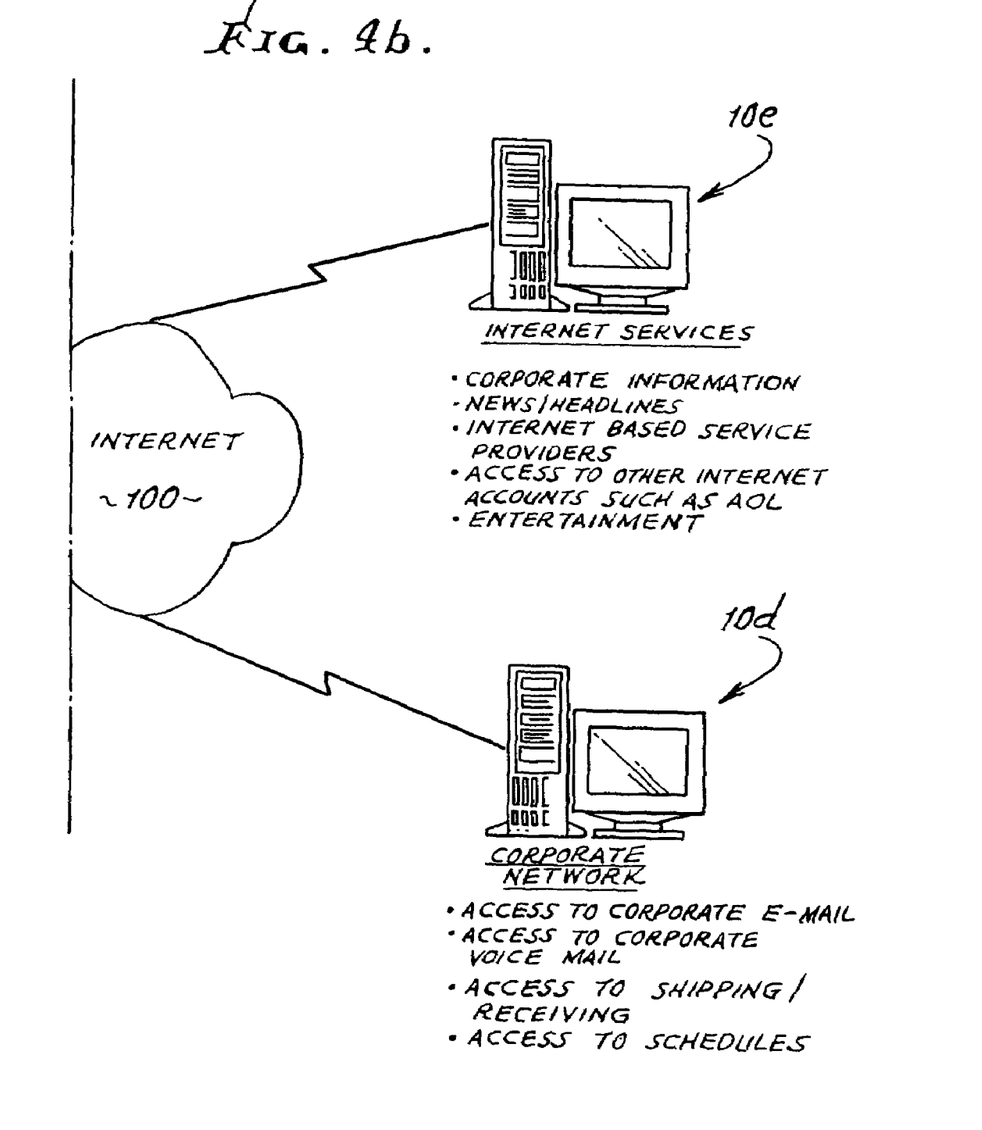

FIG. 4 shows connection of several terminals 10b, 10c, 10d an 10e, via the internet 100, and having associated functions or operations as listed. A laser printer is shown at 20b; and apparatus 31 associated with terminal 10c performs credit card billing services. Terminal 10b corresponds to that indicated in FIGS. 1-3.

The computer apparatus 13 as referred to includes circuit means operatively connected to the card reader to be responsive to reading of user credit card data to enable user access to the internet via said computer apparatus at the access station. Such circuit means typically includes elements or steps indicated at 35-49 in the FIG. 5 diagram. Elements such as 35, 36, 38 etc. may be considered as circuit means to perform the associated functions listed in the diagram. Element 40 may be considered as including the keyboard 17, and the display 17, and the display screen 18, controlled by the computer 13.

Figure 5A:
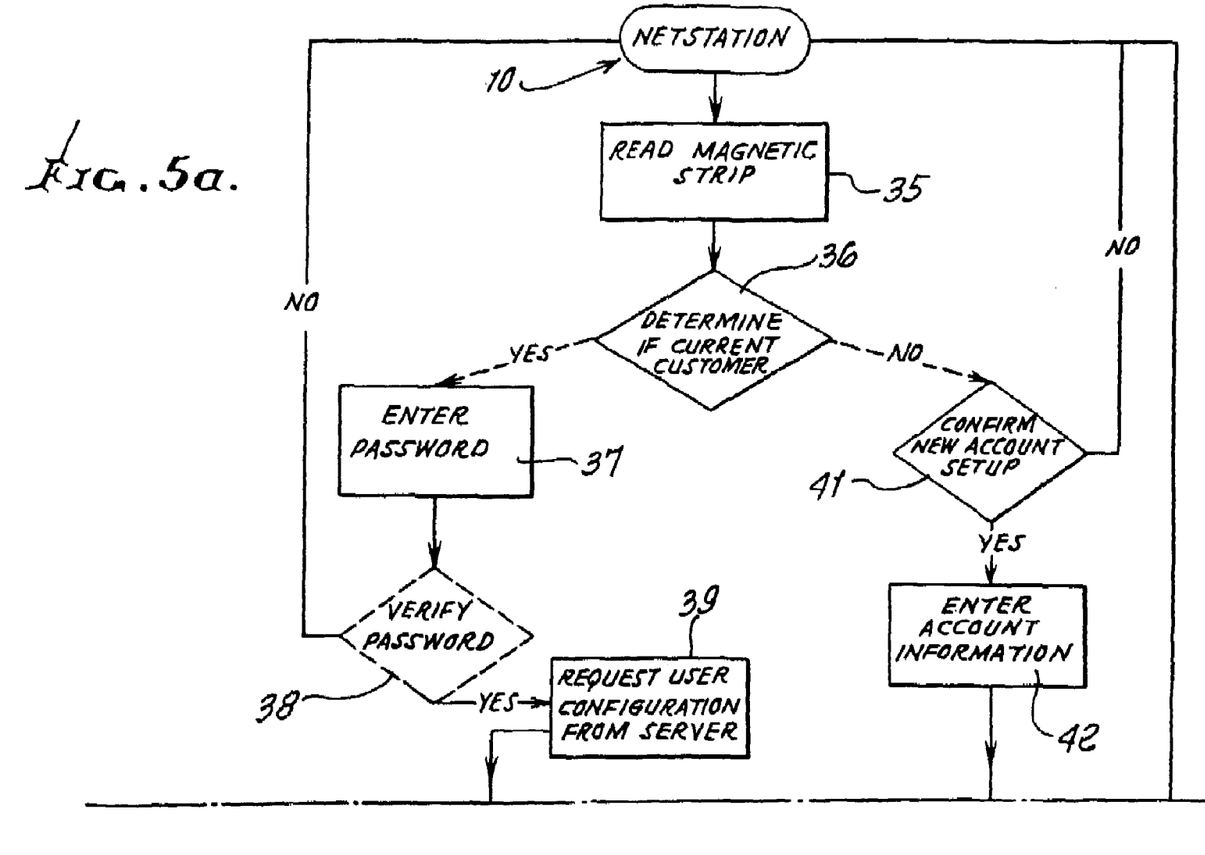
FIG. 5 is a system flow diagram.
Figure 5B:
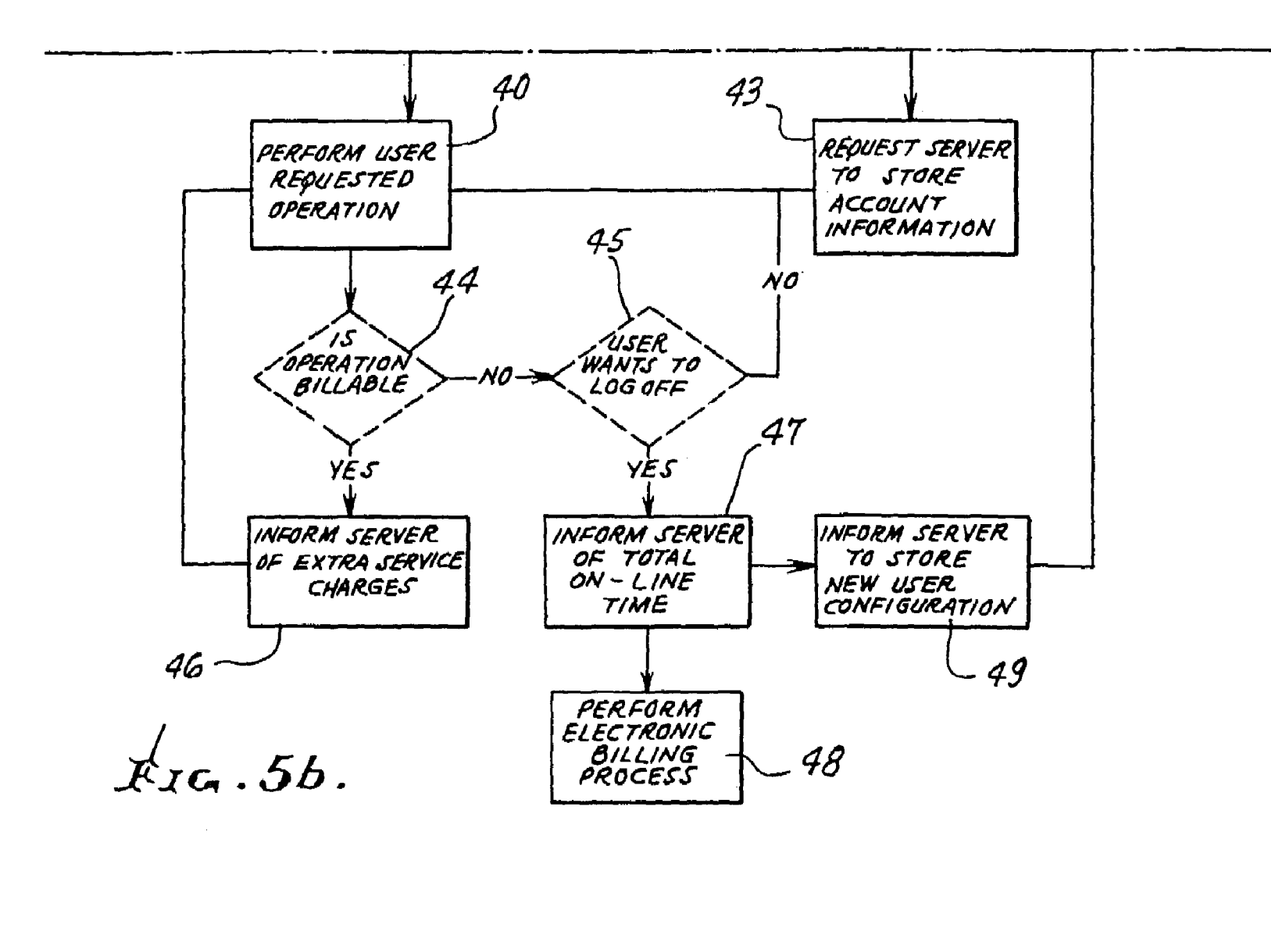

Accordingly, the circuit means referred to may be considered to be responsive to reading of a credit card to:

i) determine if that card identifies a current account customer user, whereby if "yes", the user is instructed via the display means to enter his password via the keyboard to enable subsequent performance of user requested operations associated with use of the internet, ii) and if "no", the user is instructed via the display means to confirm via the keyboard that a new account is to be established, and to enter new account information via the keyboard for storage by server means, and the user is then enabled to perform user requested operations, via the keyboard, and associated with the internet.

In one example, the terminal is comprised of a computer, monitor, floppy disk drive, PCMCIA connector and a keyboard. The computer uses a CD-ROM player in place of a hard disk drive. Some of the advantages of a CD-ROM player over a traditional disk drive are immunity from acquiring and spreading computer viruses; ability to customize the software available to the site; ability to thwart the illegal copying of featured software; and reliability. A company-created and distributed CD-ROM disc contains the necessary operating system, GUI interface and Internet software, in addition software as in FIG. 5.

The terminals may be configured as stand-alone access sites, multi-user kiosk or multi-station workgroup computing environments such as in an airport or hotel environment. The kiosk 11 is ADA (Americans with Disabilities Act) compliant.

The user activates the terminal by pressing any key; the screen saver dissolves and an opening menu appears. Two options are available: the user can simply swipe his card in a card reader, or he can select between "new user", and "type user name and password" in the opening menu. By swiping his card, the new user's name appears, and he selects a user password. Alternatively, the new user can double click on a "new user" icon, and is prompted to set up a username and a password. In either case, the system will then issue the new user an account number and an e-mail address. Next, a "wallet" symbol appears on the screen, containing the debit card, credit card or phone card number that was swiped into the system. The user can continue to swipe cards into the wallet if he wants more than one method that will be used to pay the service. An existing customer simply types in his username and password, and the system opens up his wallet.

The next step for either a new user or an existing customer is to select a card from the wallet that will be billed for the session. Upon verification of funds being available, the monitor screen changes to a welcome page and the consumer selects the services he wishes from those available on the screen: Internet access, send and receive fax, or other programs. Pricing and log-on time date is displayed in a window. After selecting Internet access, the user's screen changes to a home page, where twenty popular Web home page options are displayed. Additional Internet-based software offerings may be made available in a screen to the right of the Net browser.

Quitting the open application(s) and returning to a "close page" ends the session, and the user's charges are displayed.

Further, in operation, when a user logs off one terminal A, the server is commanded to store the user's A terminal configuration; and when the user logs onto another terminal B, this log-on commands the server to in turn command the B terminal to assume the user's A terminal configuration.

Figure 6:
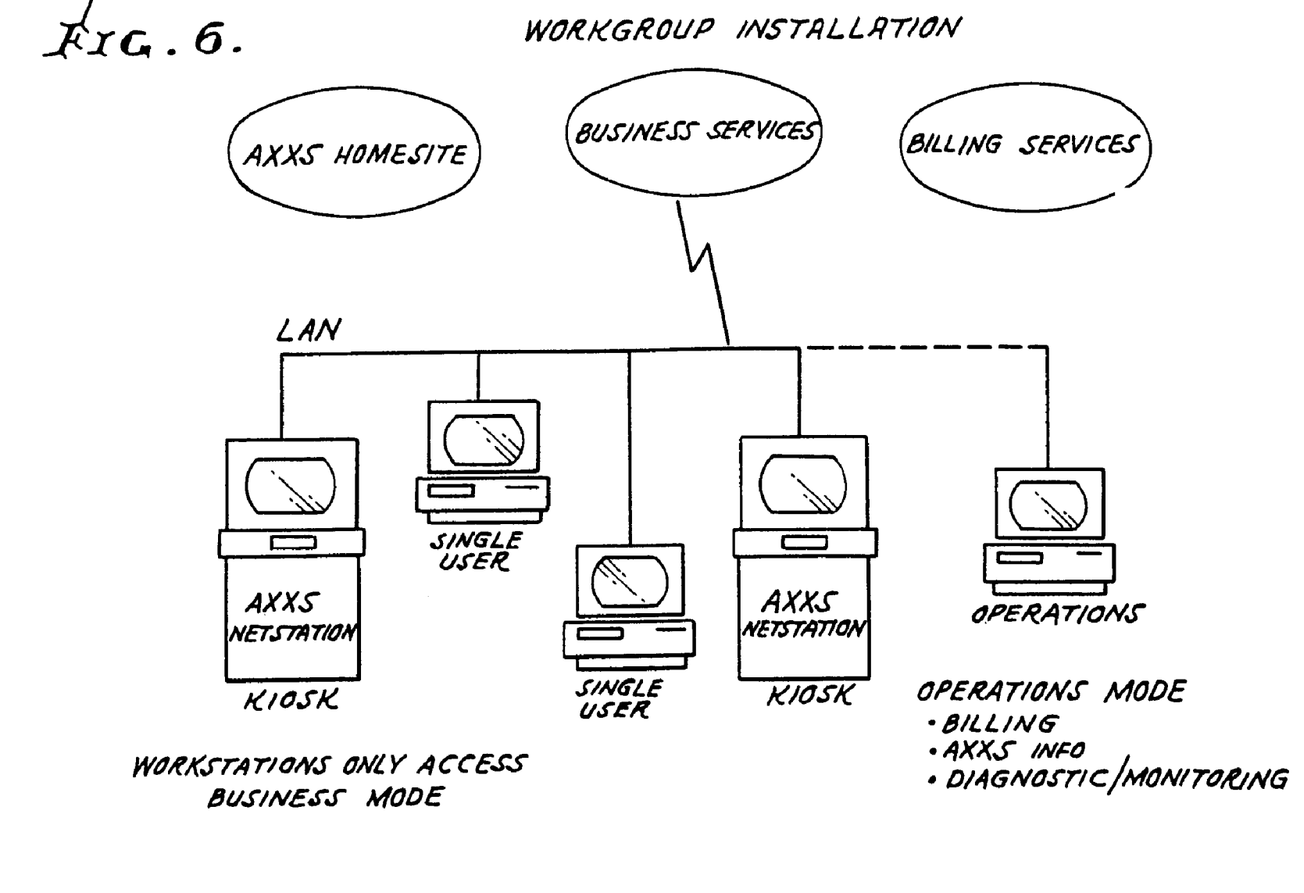
FIG. 6 is a view showing a work group installation of terminals interconnected as by a local area network.
Figure 7:
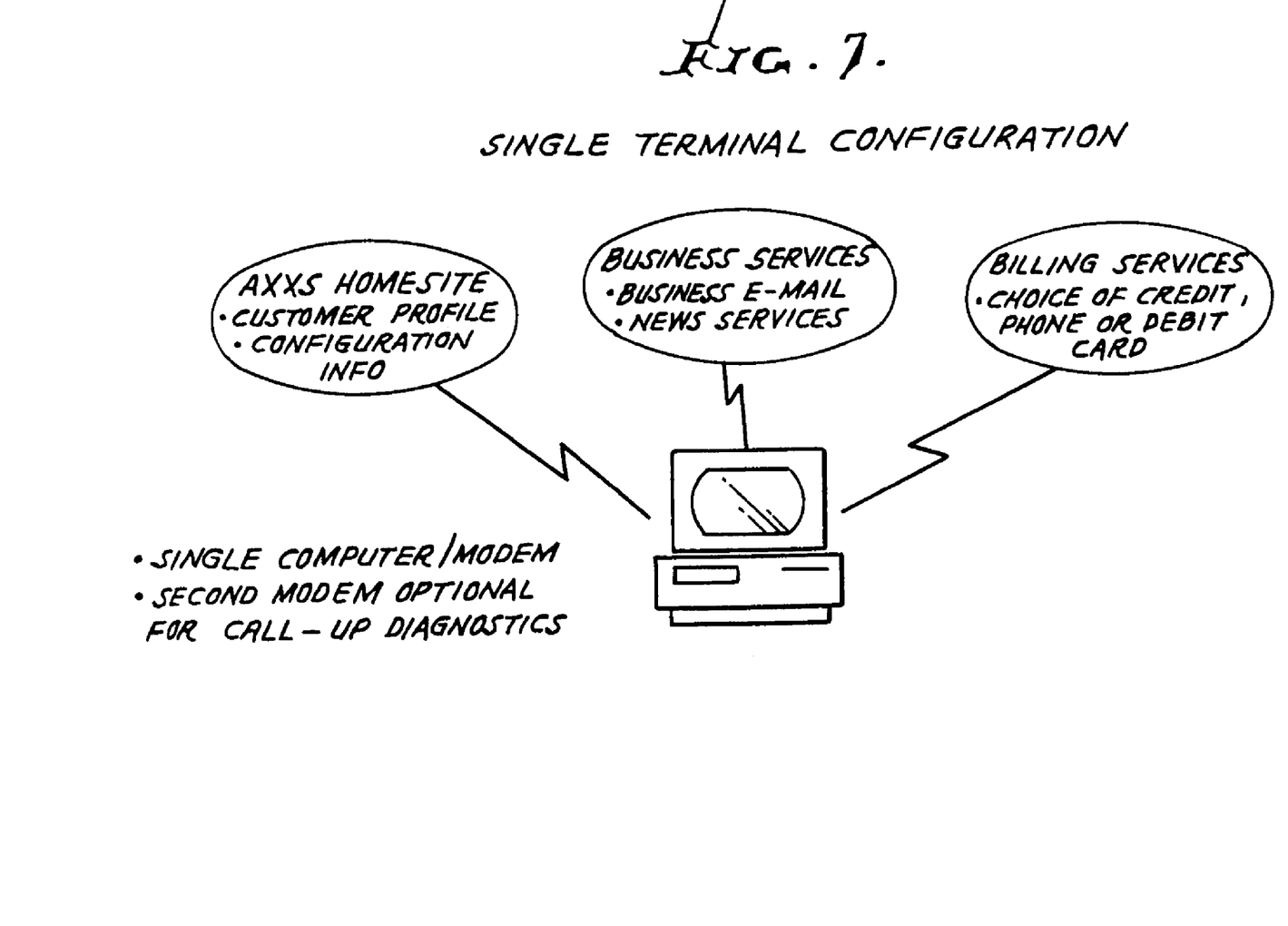
FIG. 7 is a view showing a single terminal configuration.
Figure 8:
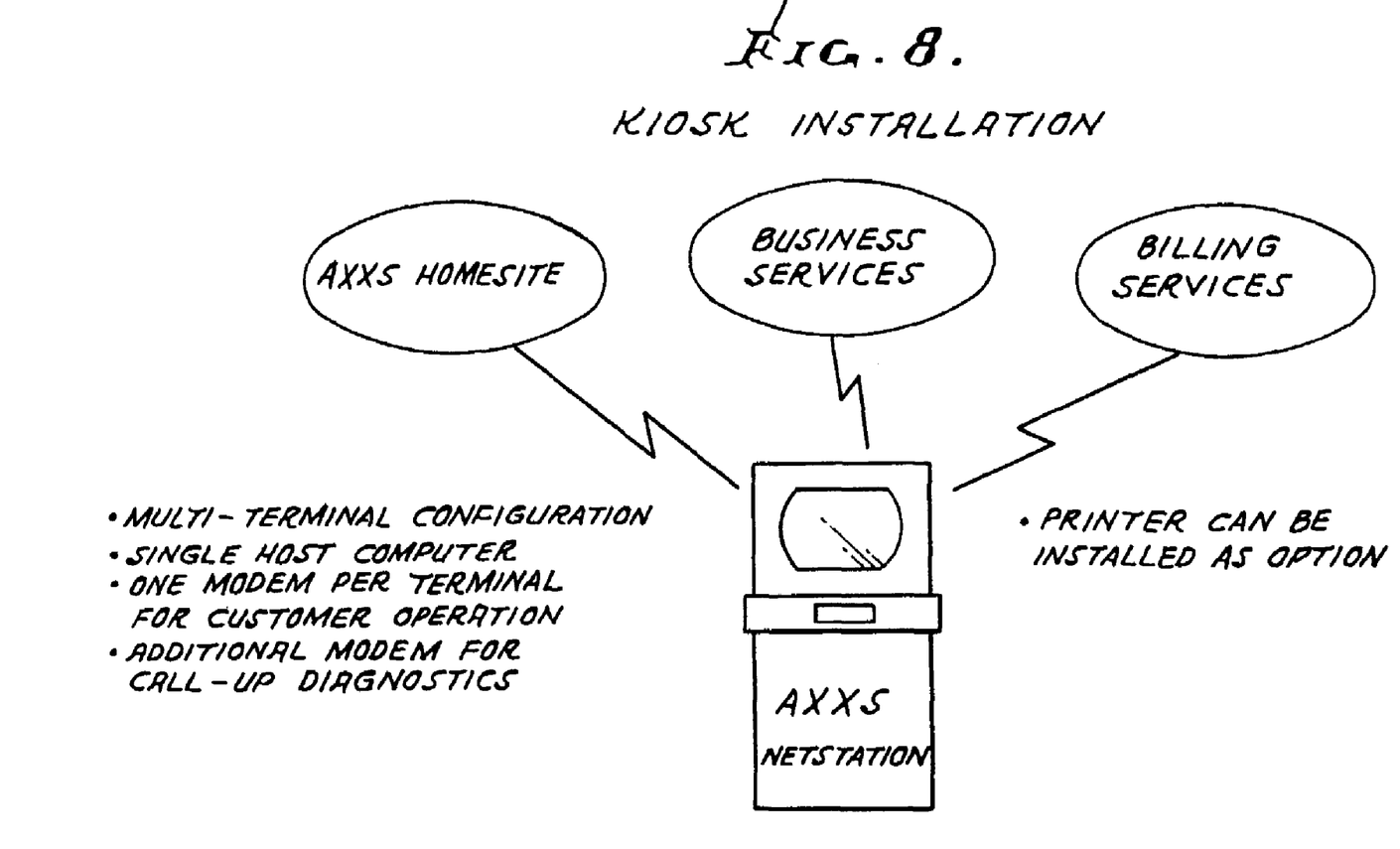
FIG. 8 is a view showing a kiosk installation.

FIGS. 6-8 show various terminal installations and groupings, as referred to in those views.

I claim:

1. An internet access terminal, comprising a system accessing the internet, the system containing:
   a) an access device, and
   b) computer apparatus at the device and including a user data input mechanism, and data display means,
   c) a user stored information card reader at the device, and said computer apparatus including circuit means operatively connected to the card reader to be responsive to reading of user card data to enable user access to the internet via said computer apparatus at the access device, and
   d) circuit means providing a means responsive to reading of the card, for establishing a new account if the user is not a current customer and wherein if the card does not identify a current account user, the user is instructed via the display means to confirm via the data input mechanism that a new account is to be established, and to enter new account information via the data input mechanism for storage by server means, and the user is then enabled to perform user requested operations, via the data input mechanism, and associated with the internet, said access device having an associated housing,
   e) said circuit means providing a means responsive to reading of the data for determining if that data identifies a current user, whereby
      i) if the data does not identify a current user, the user is instructed via the display means to enter user identity code via the data input mechanism to enable subsequent performance of user requested operations associated with use of the internet,
      ii) and if the data does not identify an authorized user, the user is instructed via the display means to enter new identification information via the data input mechanism for storage by service means, and the user is then enabled to perform user requested operations, via the data input mechanism, and associated with the internet,
   f) said means responsive to reading of the data comprising software having the following:
      i) first means accessed by a user,
      ii) second means responsive to output of the first means to read user input information,
      iii) third means responsive to output of the second means to determine if the user is an authorized user,
      iv) fourth means responsive to output of third means to enable entry of a user code,
      v) fifth means responsive to output of the fourth means to verify the user code,
      vi) sixth means responsive to output of the fifth means to request user browser configuration from an internet service,
      vii) seventh means responsive to output of the sixth means to perform a user requested browser operation.

* * * * *